United States Patent
Lee et al.

(10) Patent No.: US 11,653,204 B2
(45) Date of Patent: May 16, 2023

(54) SIDEBAND AUTHENTICATION OF STORAGE DEVICE

(71) Applicant: Samsung Electronics Co., Ltd., Suwon-si (KR)

(72) Inventors: Pyeongwoo Lee, Sunnyvale, CA (US); Young deok Kim, San Jose, CA (US); Sumanth Jannyavula Venkata, Fremont, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/809,545

(22) Filed: Mar. 4, 2020

(65) Prior Publication Data

US 2021/0227386 A1    Jul. 22, 2021

Related U.S. Application Data

(60) Provisional application No. 62/964,109, filed on Jan. 21, 2020.

(51) Int. Cl.
*H04W 12/06* (2021.01)
*G06F 13/10* (2006.01)
(Continued)

(52) U.S. Cl.
CPC ........ *H04W 12/065* (2021.01); *G06F 13/105* (2013.01); *G06F 13/1684* (2013.01); *G06F 21/602* (2013.01); *G06F 2221/2139* (2013.01)

(58) Field of Classification Search
CPC ... H04W 12/065; H04W 12/06; G06F 13/105; G06F 13/1684; G06F 21/602;
(Continued)

(56) References Cited

U.S. PATENT DOCUMENTS 7,469,303 B2    12/2008 Jeong et al.
7,477,522 B2    1/2009 Hazelzet
(Continued)

*Primary Examiner* — Quazi Farooqui
(74) *Attorney, Agent, or Firm* — Renaissance IP Law Group LLP

(57) ABSTRACT

Various aspects include a continuous authentication system for a storage system. The continuous authentication system includes a host having an encryption unit. The continuous authentication system includes a storage device having a decryption unit. The continuous authentication system includes a first physical connection between the host and the storage device. The first physical connection may be configured to transfer I/Os. The continuous authentication system may include a second physical connection between the host and the storage device. The encryption unit may be configured to encrypt a continuous authentication signal. The host may be configured to transmit the continuous authentication signal through the second physical connection. The storage device may be configured to receive the continuous authentication signal through the second physical connection. The decryption unit may be configured to decrypt the continuous authentication signal. When the second physical connection is tampered with, the storage device may stop processing the I/Os.

17 Claims, 11 Drawing Sheets

(51) Int. Cl.
  *G06F 13/16* (2006.01)
  *G06F 21/60* (2013.01)
  *H04W 12/065* (2021.01)

(58) Field of Classification Search
  CPC .. G06F 2221/2139; G06F 21/79; G06F 13/10; G06F 13/16; G06F 21/60
  See application file for complete search history.

(56) References Cited

U.S. PATENT DOCUMENTS

| | | | |
|---|---|---|---|
| 8,832,843 | B2 | 9/2014 | Yoon |
| 8,970,768 | B2* | 3/2015 | Ahn ................. H01L 27/14629 348/340 |
| 9,143,504 | B1* | 9/2015 | Shi .......................... G06F 21/62 |
| 9,336,130 | B2 | 5/2016 | Asfur et al. |
| 9,578,024 | B2* | 2/2017 | Cheng ..................... H04L 63/12 |
| 2011/0038479 | A1* | 2/2011 | Bilodi ................... H04L 9/0894 380/45 |
| 2013/0050955 | A1* | 2/2013 | Shinsato ................. G06F 1/181 361/727 |
| 2013/0283381 | A1 | 10/2013 | Thadikaran et al. |
| 2014/0164771 | A1 | 6/2014 | Danree et al. |
| 2017/0171220 | A1* | 6/2017 | Thomson ............ H04L 63/0227 |
| 2018/0032459 | A1 | 2/2018 | Takahashi et al. |
| 2021/0138982 | A1* | 5/2021 | Schumacher ........... B60L 53/66 |
| 2021/0176065 | A1* | 6/2021 | Osaki ...................... G06F 21/80 |
| 2021/0385653 | A1* | 12/2021 | Sau ....................... H04L 63/068 |

* cited by examiner

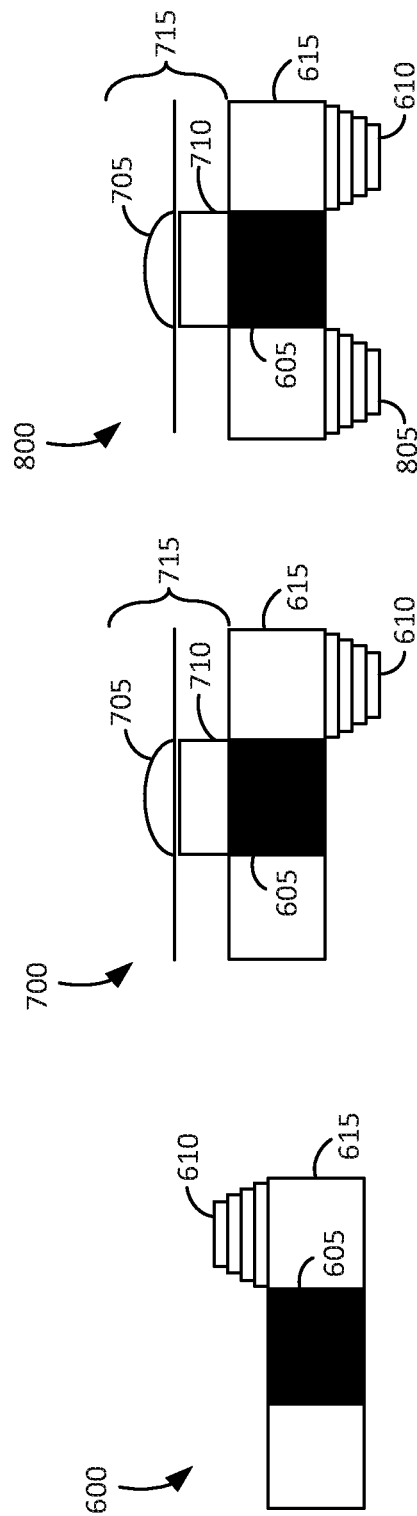
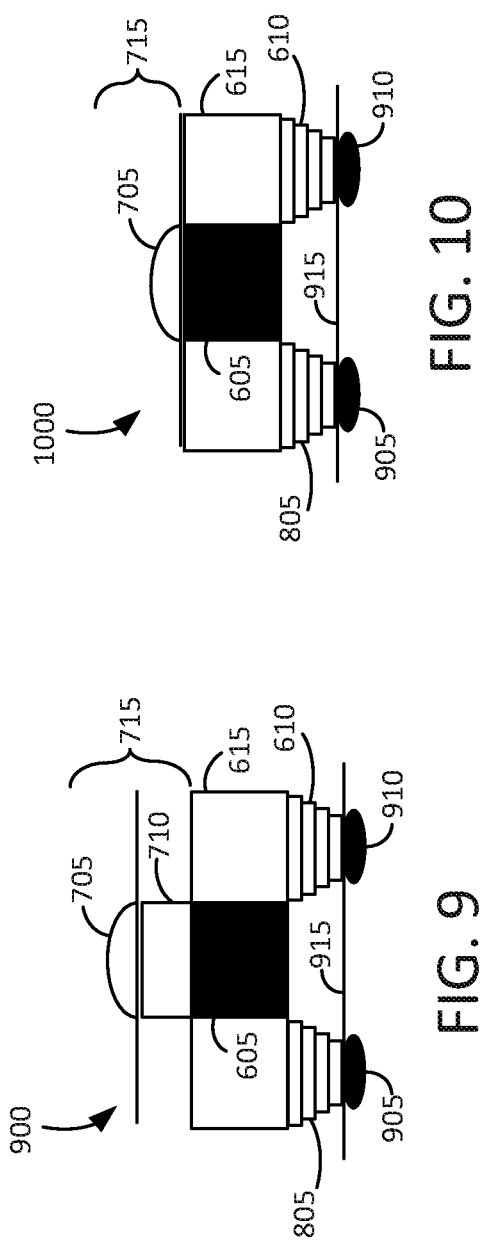

SIDEBAND AUTHENTICATION OF STORAGE DEVICE

RELATED APPLICATION DATA

This application claims the benefit of U.S. Provisional Application Ser. No. 62/964,109, filed on Jan. 21, 2020, which is hereby incorporated by reference.

TECHNICAL AREA

The present embodiments relate to storage systems, and more particularly, to systems and methods for providing continuous authentication of a storage device using a sideband channel.

BACKGROUND

Reliable authentication of storage devices can be important. Some vendors may be encrypting data using public key encryption. However, some standards such as Peripheral Component Interconnect Express (PCIE) and Non-Volatile Memory Express (NVME) protocol standards, which are used in the storage industry, may not provide a suitable mechanism to protect a command. Instead, such protocols may only encrypt payload data. Thus, if a public key is known, an entity can access the data from the storage device in an offline condition (i.e., after detaching the storage device from the host system).

BRIEF SUMMARY

Various embodiments of the disclosure include a continuous authentication system. The continuous authentication system may include a host having an encryption unit. The continuous authentication system may include a storage device having a decryption unit. The continuous authentication system may include a first physical connection between the host and the storage device. The first physical connection may be configured to transfer one or more input/output requests (I/O). The continuous authentication system may include a second physical connection between the host and the storage device. The encryption unit may be configured to encrypt a continuous authentication signal. It will be understood that the term "continuous" may include a periodic authentication signal, and/or multiple discrete authentication signals. The host may be configured to transmit the continuous authentication signal through the second physical connection. The storage device may be configured to receive the continuous authentication signal through the second physical connection. The decryption unit may be configured to decrypt the continuous authentication signal.

BRIEF DESCRIPTION OF THE DRAWINGS

The foregoing and additional features and advantages of the present disclosure will become more readily apparent from the following detailed description, made with reference to the accompanying figures, in which:

FIGS. 6 to 10 are example diagrams of storage devices including a micro-lens in accordance with some embodiments.

DETAILED DESCRIPTION

Figure 1:
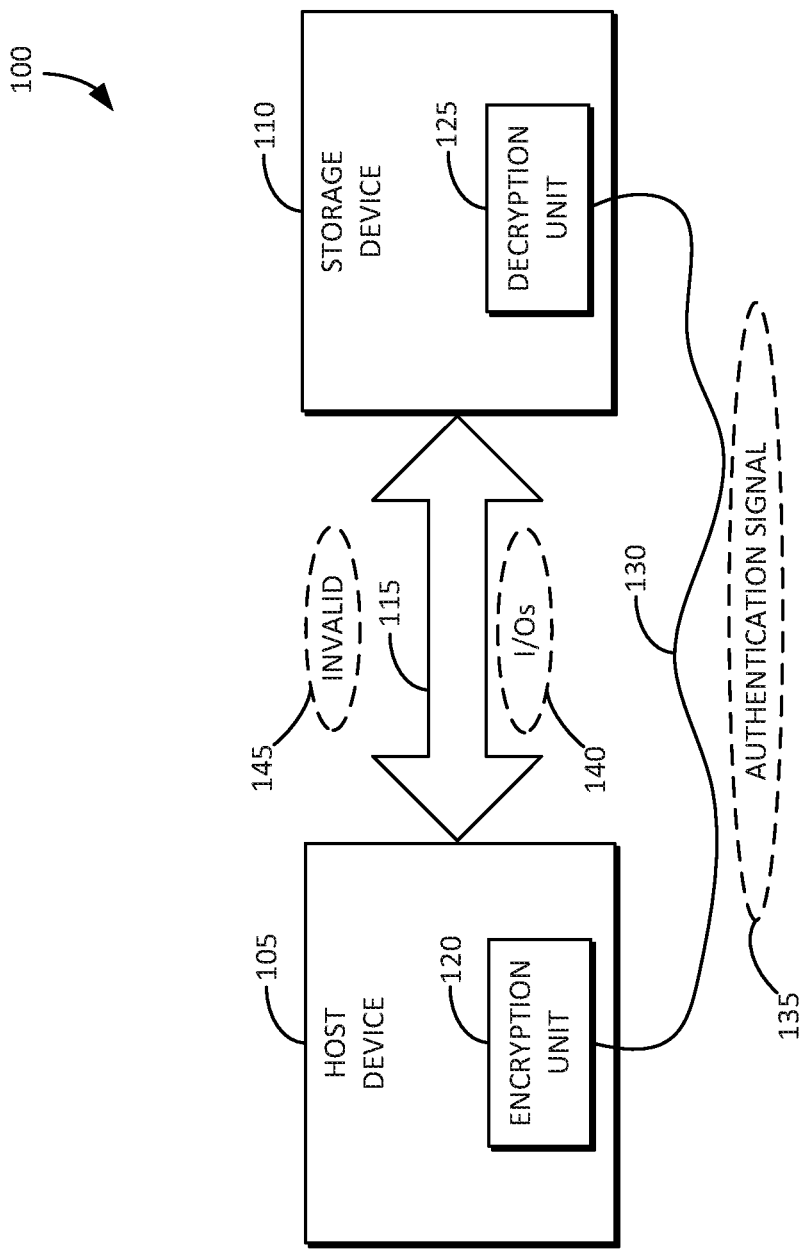
FIG. 1 is an example diagram of a continuous authentication system in accordance with some embodiments.

Reference will now be made in detail to embodiments disclosed herein, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first interface could be termed a second interface, and, similarly, a second interface could be termed a first interface, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments disclosed herein include a continuous authentication system to protect from unauthorized access to a storage device, for example, when the storage device is disconnected from a host device. The host device can transmit a periodic authentication signal via a sideband channel. When the storage device is installed for a first time, the host device may start to give an incremental counter number, periodically, to the storage device in encrypted form. The storage device may permit operations to be performed when a valid counter number is received from the host device. In some embodiments, the storage device may permit operations to be performed only when a valid counter number is received from the host device.

For example, when the storage device is initially installed, the host device may provide an initial counter value to the storage device, in encrypted form, through a sideband channel, which may be separated from a main data path. The host device may send an incremental counter number to the storage device, periodically, through the sideband channel. When the storage device does not receive one or more valid counter numbers that are increasing periodically, the storage device may stop performing normal operations, and may respond with an invalid signal for all commands received from the host system from that point forward in time. The counter number can be transferred in a slower sideband channel, instead of a faster main data bus, for implementation cost efficiency, and to avoid interfering with the transfer of I/Os between the host device and the storage device.

FIG. 1 is an example diagram of a continuous authentication system 100 in accordance with some embodiments. The continuous authentication system 100 may include a host device 105 and a storage device 110. The host device 105 may include an encryption unit 120. The storage device 110 may include a decryption unit 125. The continuous authentication system 100 may include a first physical connection 115 between the host device 105 and the storage device 110. The first physical connection 115 may transfer one or more I/Os 140 between the host device 105 and the storage device 110. The continuous authentication system 100 may include a second physical connection 130 between the host device 105 and the storage device 110.

The encryption unit 120 may encrypt a continuous authentication signal 135. The host device 105 may transmit the continuous authentication signal 135 through the second physical connection 130. The storage device 110 may receive the continuous authentication signal 135 through the second physical connection 130. The decryption unit 125 may decrypt the continuous authentication signal 135.

The continuous authentication signal 135 may include a periodically incrementing integer value, for example. In some embodiments, the storage device 110 may stop processing the one or more I/Os 140 in response to the periodically incrementing integer value 135 missing a chronological increment and/or having a non-chronological increment. In some embodiments, the storage device 110 may return one or more invalid signals 145 to the host device 105 through the first physical connection 115 in response to the periodically incrementing integer value 135 missing a chronological increment and/or having a non-chronological increment through the second physical connection 130. In some embodiments, the storage device 110 is configured to stop processing the one or more I/Os 140 in response to not receiving the periodically incrementing integer value 135 for a period of time that exceeds a threshold value. The storage device 110 may return the one or more invalid signals 145 to the host device 105 through the first physical connection 115 in response to not receiving the periodically incrementing integer value 135 for a period of time that exceeds the threshold value.

The threshold value can be selected such that it is long enough to detect when the second physical connection 130 has likely been tampered with, but not too long that false positives are generated. For example, the threshold value can be on the order of seconds, such as about 1 second, about 2 seconds, about 3 seconds, about 5 seconds, about 10 seconds, or so forth. In some embodiments, the threshold value can be less than a second. In some embodiments, the threshold value can be more than 10 seconds.

In some embodiments, the second physical connection 130 may include a fiber optic medium. In some embodiments, the second physical connection 130 may include a wire or other suitable conductor. In some embodiments, the first physical connection 115 includes at least one of a wire, a fiber optic medium, a bus, a switch, a fabric, or other suitable conductor. The first physical connection 115 may support a first protocol having a first performance characteristic. The second physical connection 130 may support a second protocol having a second performance characteristic. The first performance characteristic of the first protocol may be faster (e.g., higher bandwidth and/or higher throughput) than the second performance characteristic of the second protocol. In other words, the sideband signal channel 130 can be implemented in a relatively slow connection in comparison to the main data path 115. This approach provides implementation efficiency, while eliminating the possibility that the continuous authentication signal 135 interferes with otherwise valid I/Os being transferred between the host device 105 and the storage device 110 via the first physical connection 115. The protocol used for transferring the one or more I/Os may include, for example, PCIE, NVME, Ethernet, Infiniband®, transmission control protocol/Internet protocol (TCP/IP), Fibre Channel, or the like. In an alternative embodiment, the continuous authentication signal 135 is transmitted inband via the first physical connection 115, and in such an embodiment, the second physical connection 130 is not needed.

Figure 2:
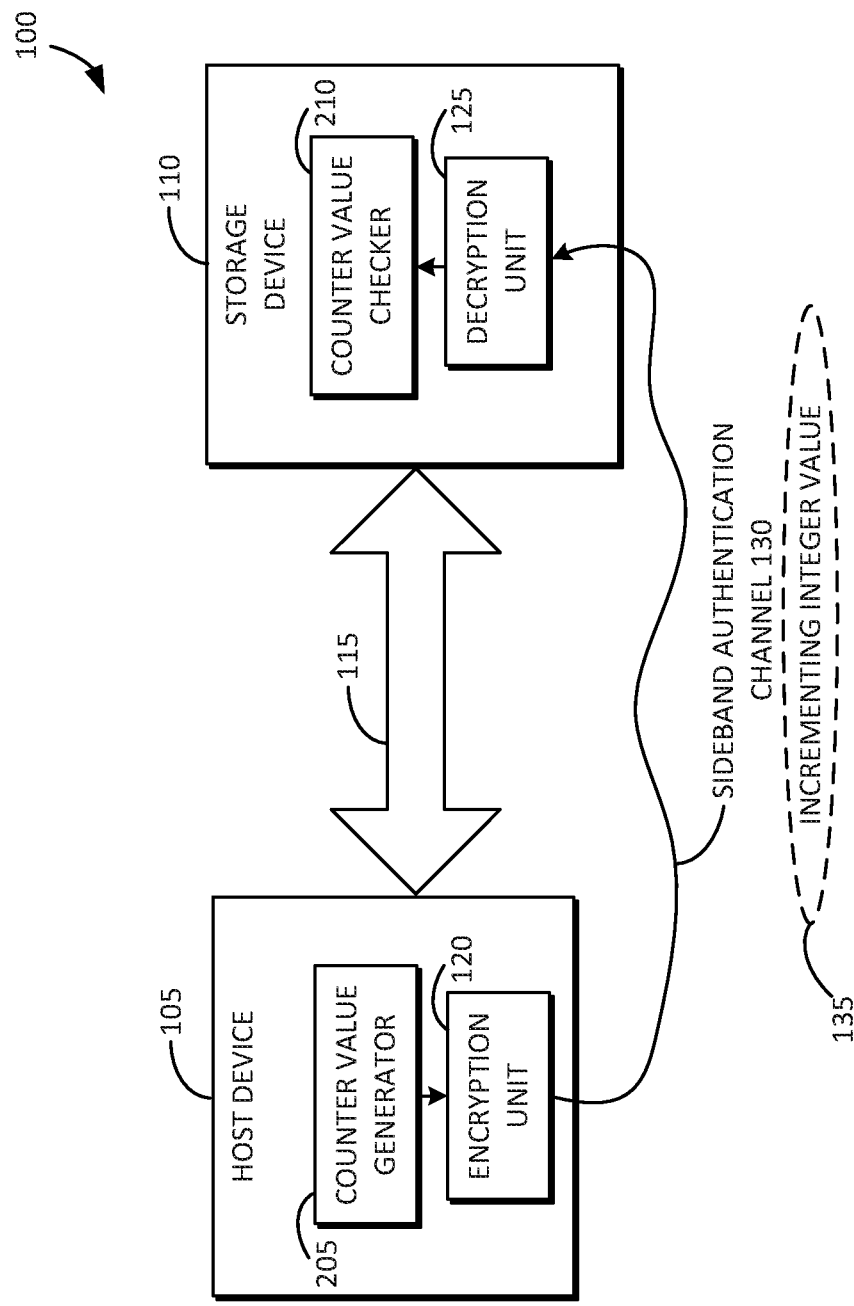
FIG. 2 is an example diagram of the continuous authentication system of FIG. 1 showing example details in accordance with some embodiments.

FIG. 2 is an example diagram of the continuous authentication system 100 of FIG. 1 showing example details in accordance with some embodiments. The host device 105 may include a counter value generator 205, which can be coupled to or otherwise part of the encryption unit 120. The storage device 110 may include a counter value checker 210, which is coupled to or otherwise part of the decryption unit 125. The counter value generator 205 may generate a periodically incrementing integer value 135, for example, in beacon signal fashion. The encryption unit 120 may encrypt the periodically incrementing integer value 135. The decryption unit 125 may decrypt the periodically incrementing integer value 135. The counter value checker 210 may check the periodically incrementing integer value 135. The periodically incrementing integer value 135 may be transmitted via the sideband authentication channel 130. When the counter value checker 210 detects an anomaly in the periodically incrementing integer value 135, then the storage device 110 may stop processing the one or more I/Os, and may instead send invalid responses to the host device 105 for any command issued by the host device 105 from that point forward.

Figure 3:
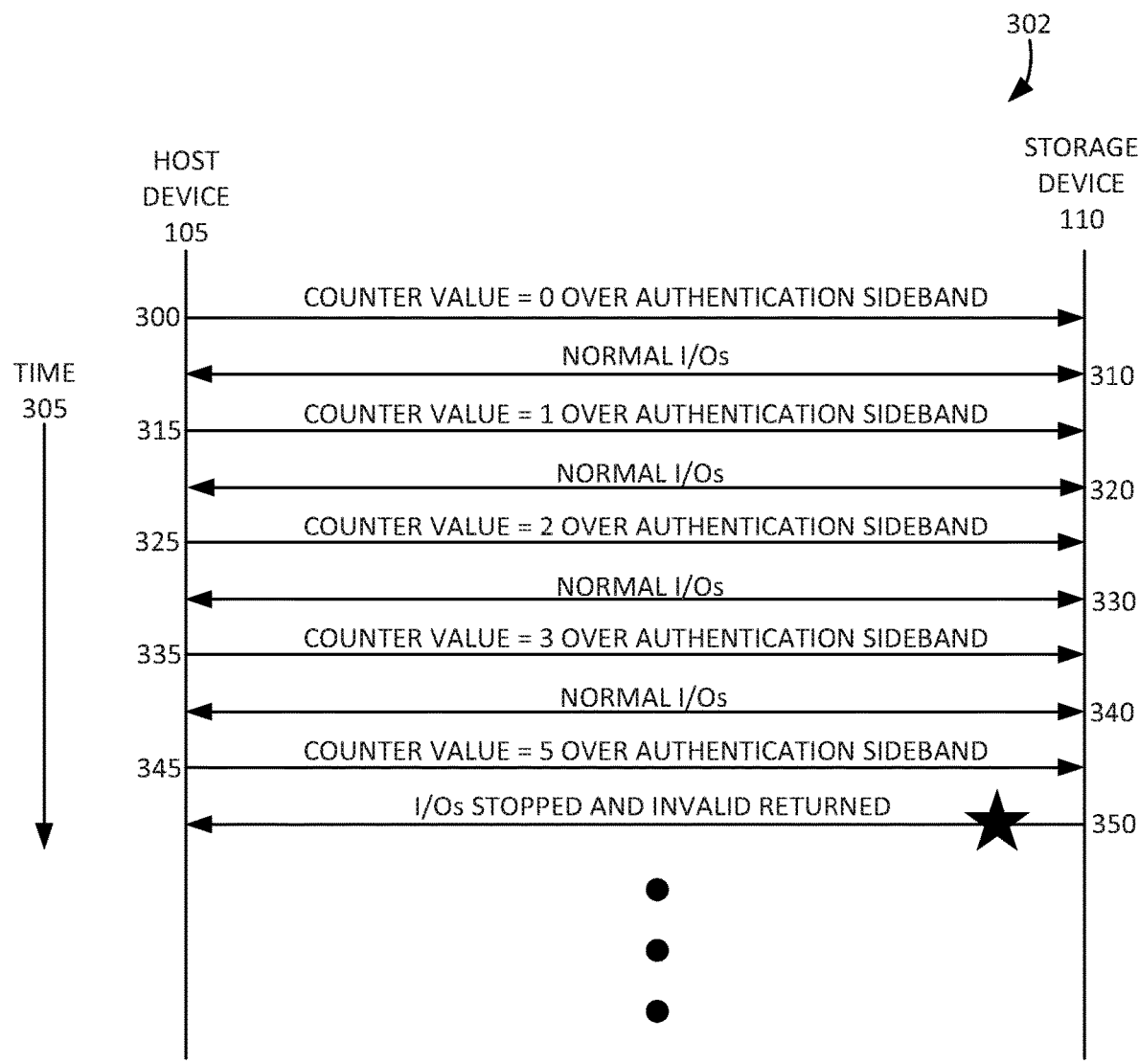
FIG. 3 is an example timing flow diagram of the operation of the continuous authentication system in accordance with some embodiments.

FIG. 3 is an example timing flow diagram 302 of the operation of the continuous authentication system (e.g., 100 of FIG. 1) in accordance with some embodiments. The direction of time is shown by the time arrow 305. At 300, the host device 105 may send an initial counter value, such as 0, over the authentication sideband channel (e.g., 130 of FIG. 1). At 310, the one or more I/Os (e.g., 140 of FIG. 1) may be processed in a normal fashion, for example, without any disruption to the generation, flow, receipt, and processing of the I/Os. At 315, the host device 105 may send an incremented counter value, such as 1, over the authentication sideband channel to the storage device 110. At 320, the one or more I/Os may continue to be processed in a normal fashion, for example, without any disruption to the generation, flow, receipt, and processing of the I/Os. At 325, the host device 105 may send an incremented counter value, such as 2, over the authentication sideband channel to the storage device 110. At 330, the one or more I/Os may continue to be processed in a normal fashion, for example, without any disruption to the generation, flow, receipt, and processing of the I/Os. At 335, the host device 105 may send an incremented counter value, such as 3, over the authentication sideband channel to the storage device 110. At 340, the one or more I/Os may continue to be processed in a normal fashion, for example, without any disruption to the generation, flow, receipt, and processing of the I/Os. At 345 the host device 105 may send an incremented counter value, such as 5, over the authentication sideband channel to the storage device 110.

At 350, the storage device 110 may stop processing the one or more I/Os because the chronological counter value of 4 was skipped or missing, which indicates that the sideband authentication channel 130 is possibly being tampered with. Alternatively or in addition, the storage device 110 may send one or more invalid signals (e.g., 145 of FIG. 1) to the host device 105 in response to I/Os received from the host device 105 from that point (i.e., when detecting the skipped or missing chronological counter value) forward in time.

Figure 4:
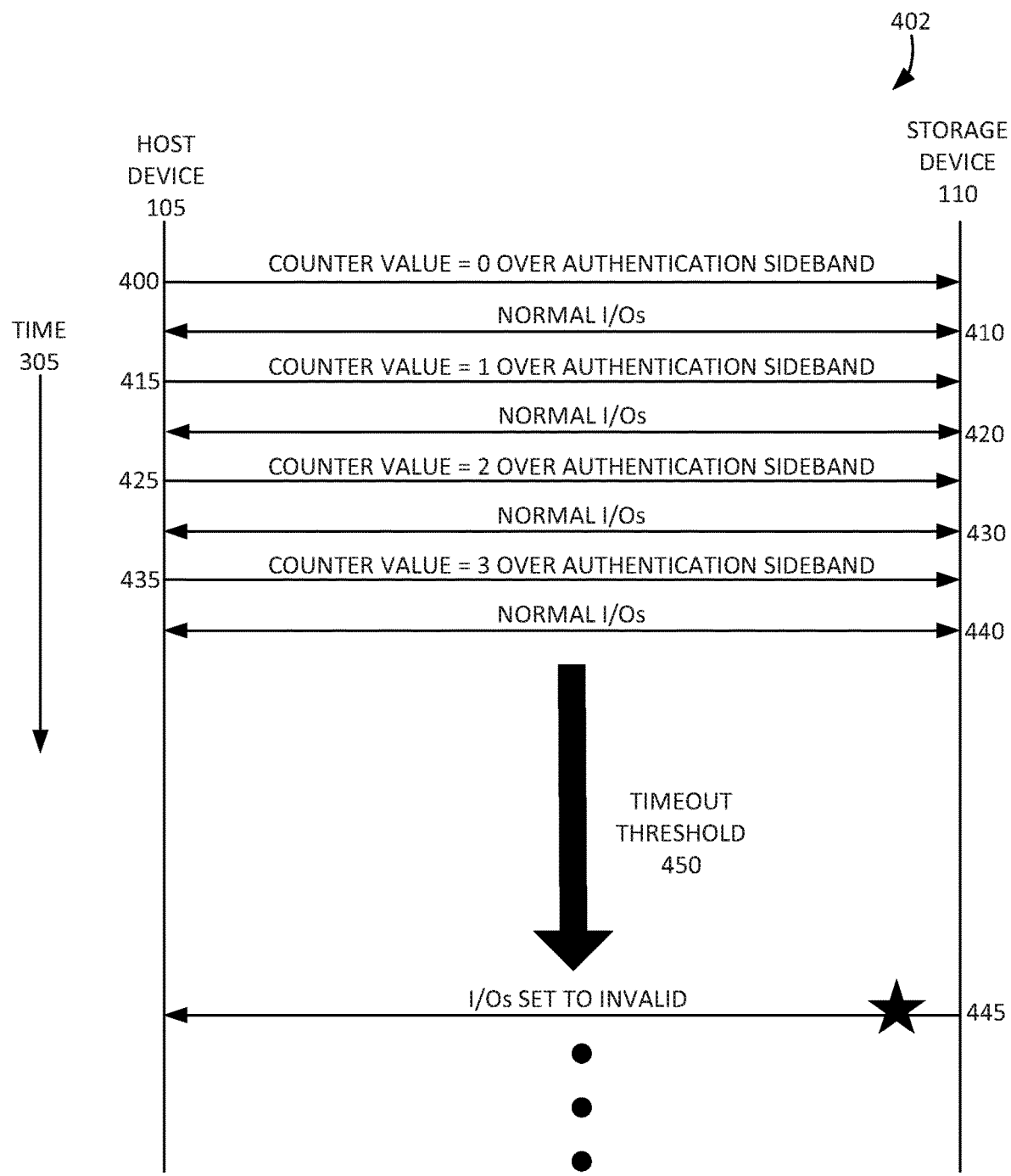
FIG. 4 is another example timing flow diagram of the operation of the continuous authentication system including a threshold timeout in accordance with some embodiments.

FIG. 4 is another example timing flow diagram 402 of the operation of the continuous authentication system (e.g., 100 of FIG. 1) including a threshold timeout in accordance with some embodiments. The direction of time is shown by the time arrow 305. At 400, the host device 105 may send an initial counter value, such as 0, over the authentication sideband channel (e.g., 130 of FIG. 1). At 410, the one or more I/Os (e.g., 140 of FIG. 1) may be processed in a normal fashion, for example, without any disruption to the generation, flow, receipt, and processing of the I/Os. At 415, the host device 105 may send an incremented counter value, such as 1, over the authentication sideband channel to the storage device 110. At 420, the one or more I/Os may continue to be processed in a normal fashion, for example, without any disruption to the generation, flow, receipt, and processing of the I/Os. At 425, the host device 105 may send an incremented counter value, such as 2, over the authentication sideband channel to the storage device 110. At 430, the one or more I/Os may continue to be processed in a normal fashion, for example, without any disruption to the generation, flow, receipt, and processing of the I/Os. At 435, the host device 105 may send an incremented counter value, such as 3, over the authentication sideband channel to the storage device 110. At 440, the one or more I/Os may continue to be processed in a normal fashion, for example, without any disruption to the generation, flow, receipt, and processing of the I/Os.

At this point, the storage device 110 may stop receiving the incremented counter value, which may be an indication that the sideband authentication channel 130 is possibly being tampered with. After a timeout threshold 450 has transpired, the storage device 110 may stop processing the one or more I/Os at 445, because of the indication that the sideband authentication channel 130 is possibly being tampered with. Alternatively or in addition, the storage device 110 may send one or more invalid signals (e.g., 145 of FIG. 1) to the host device 105 in response to I/Os received from the host device 105 from that point (i.e., when the timeout threshold 450 is reached) forward in time.

Figure 5:
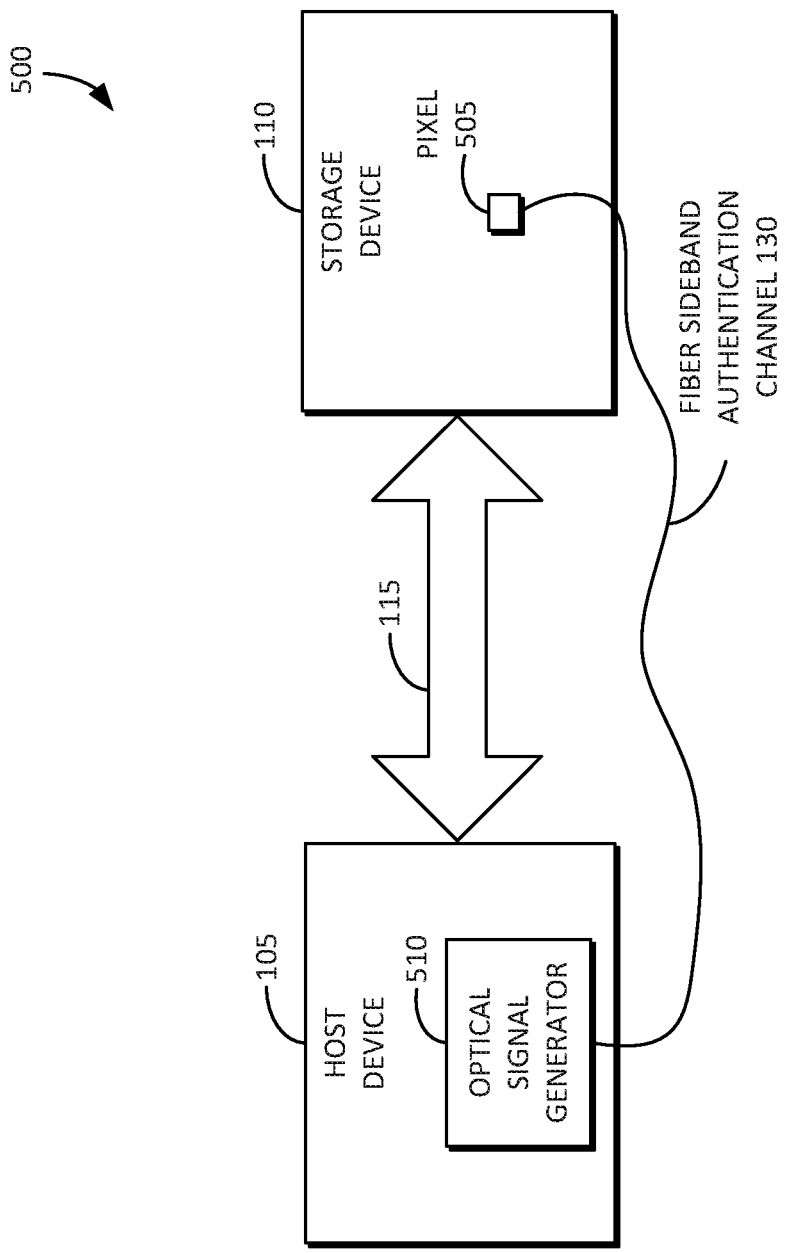
FIG. 5 is an example diagram of a continuous authentication system including a fiber sideband and a pixel in accordance with some embodiments.

FIG. 5 is an example diagram of a continuous authentication system 500 including a fiber sideband authentication channel 130 and a pixel 505 in accordance with some embodiments. Some components and reference numerals shown in FIG. 5 are described above, and an additional description is not necessarily repeated here. For additional signal barrier security, the sideband authentication channel 130 can use a fiber cable medium that receives a light signal representing the valid incrementing counter values. The host device 105 may include an optical signal generator 510 that may produce the light signal. A light signal receiving part may be implemented as a pixel 505 in the storage device 110, as further described below. The pixel 505 may be part of or otherwise incorporated into the storage device 110. In some embodiments, the pixel 505 may be part of or otherwise incorporated into a processor, a field programmable gate array (FPGA), an application specific integrated circuit (ASIC), a storage enclosure, a storage chassis, a storage rack, combinations thereof, and/or the like.

FIGS. 6 to 10 are example diagrams of storage devices (e.g., 600, 700, 800, 900, and 1000) including a micro-lens in accordance with some embodiments. Reference is now made to FIGS. 6 to 10.

The storage devices (e.g., 600, 700, 800, 900, and 1000) may include an SSD controller system on a chip (SOC). Some SSD controllers are produced using a flip-chip technology process, and may include a substrate (e.g., 615). The SSD controller may include a back side illumination (BSI) complementary metal-oxide-semiconductor (CMOS) image sensor 715, which may be implemented as a pixel (e.g., 505 of FIG. 5). The BSI CMOS image sensor 715 may include a light receiving part, such as a micro-lens 705. The BSI CMOS image sensor 715 may optionally include a color filter 710. The BSI CMOS image sensor 715 may not include the color filter 710, as shown in FIG. 10.

The BSI CMOS image sensor 715 may be disposed on a back side of the substrate 615. One or more metal layers (e.g., 610, 805) and one or more P or N wells 605 may be disposed on a front side of the substrate 615. The storage devices (e.g., 600, 700, 800, 900, and 1000) may be coupled to a printed circuit board 915 or other suitable pad using solder bumps (e.g., 905, 910).

One advantage of this approach is that the valid counter values can be made and/or detected using CMOS technology, for example, using an SSD controller SOC. Since some SSD controllers use a flip-chip technology process, the pixel can be made in a back side of substrate.

Figure 11:
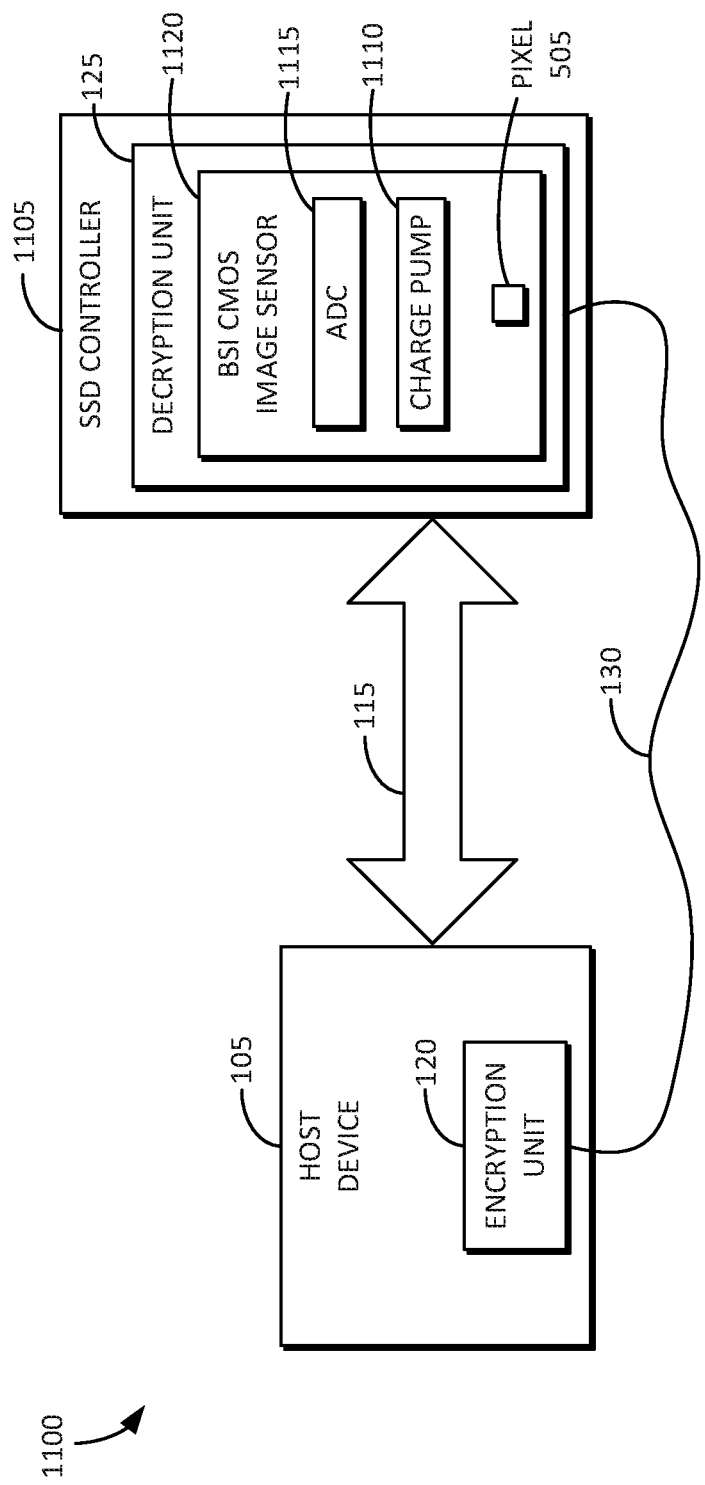
FIG. 11 is an example diagram of a continuous authentication system including a solid state drive (SSD) controller and an image sensor in accordance with some embodiments.

FIG. 11 is an example diagram of a continuous authentication system 1100 including an SSD controller 1105 and an image sensor 1120 in accordance with some embodiments. The SSD controller 1105 may include the decryption unit 125. The decryption unit 125 may include a BSI CMOS image sensor 1120. The BSI CMOS image sensor 1120 may include a charge pump 1110 and an analog-to-digital converter (ADC) 1115. Since the pixel 505 is not for a visualized image-like picture, the disclosed system 1100 may not need a color filter. The pixel 505 may generate a charge electron when the light signal arrives, and the pixel 505 can be sampled by the charge pump 1110 and the ADC 1115, for example. In this manner, the SSD controller 1105 can determine the incrementing integer value (e.g., 135) from the received light signal. In an alternative embodiment, Inter-Integrated Circuit (I²C) can be used instead to transmit, carry, or receive the incrementing integer value, and/or in combination with the embodiments disclosed above.

Figure 12:
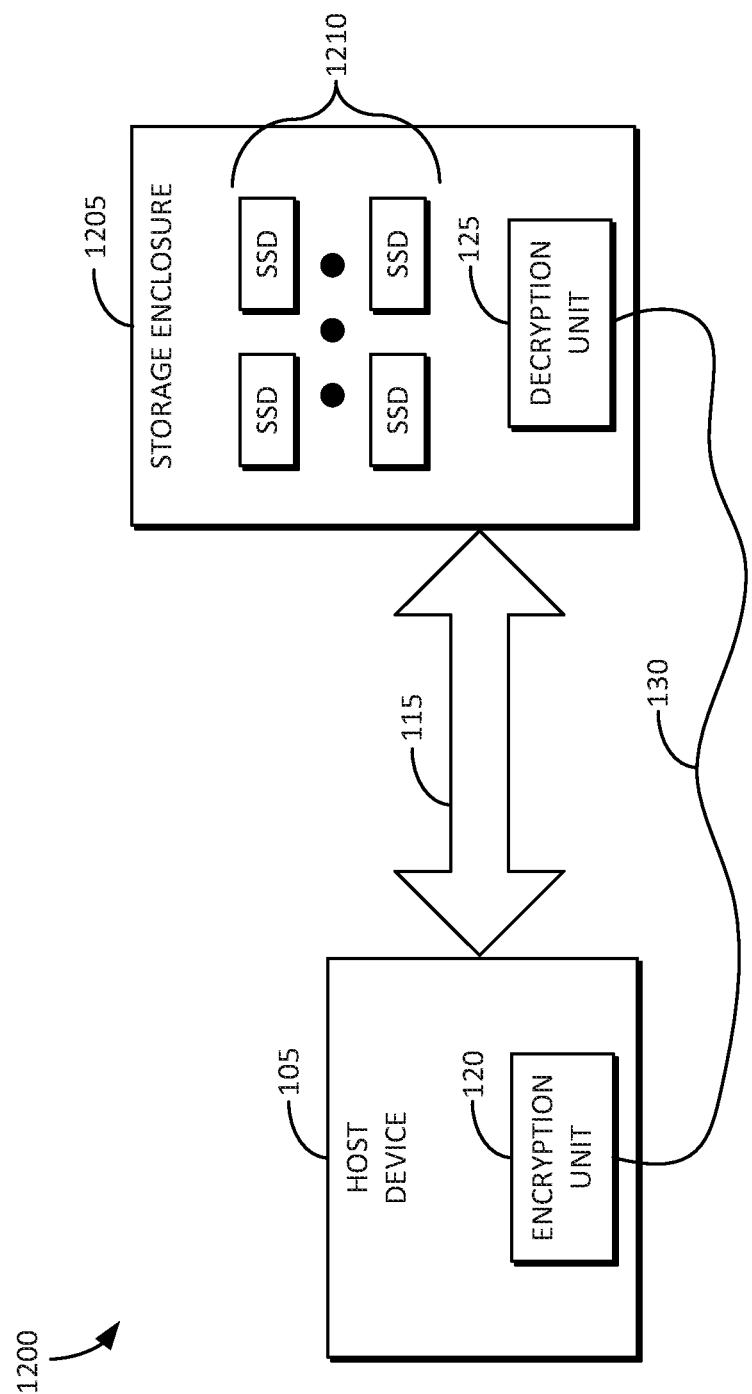
FIG. 12 is an example diagram of a continuous authentication system including a storage enclosure in accordance with some embodiments.

FIG. 12 is an example diagram of a continuous authentication system 1200 including a storage enclosure 1205 in accordance with some embodiments. The storage device (e.g., 110 of FIG. 1) may further include one or more storage enclosures 1205. The one or more storage enclosures 1205 may include one or more SSD controllers 1210. The one or more storage enclosures 1205 may include the decryption unit 125. The decryption unit 125 may be associated with each of the one or more SSD controllers 1210 of the one or more storage enclosures 1205. In this manner, all of the one or more storage enclosures 1205 may be continuously authenticated using a single decryption unit 125. When the second physical connection 130 is tampered with, the I/Os associated with all of the one or more storage enclosures 1205 may be stopped, and invalid responses returned to the host device 105.

Figure 13:
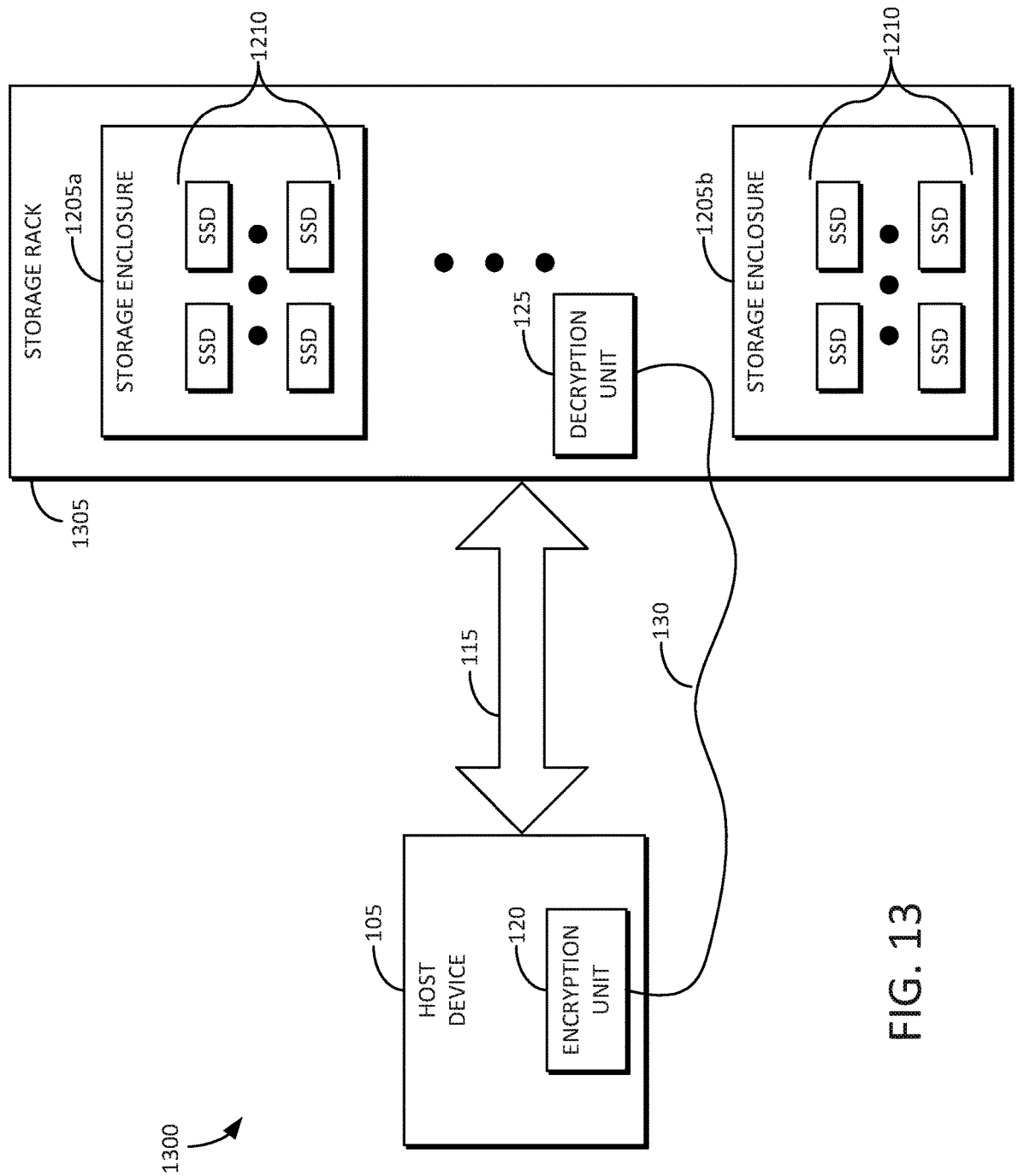
FIG. 13 is an example diagram of a continuous authentication system including a storage rack in accordance with some embodiments.

FIG. 13 is an example diagram of a continuous authentication system 1300 including a storage rack 1305 in accordance with some embodiments. The storage device (e.g., 100 of FIG. 1) may further include one or more storage racks 1305. The one or more storage racks 1305 may include one or more storage enclosures (e.g., 1205a, 1205b). The one or more storage enclosures (e.g., 1205a, 1205b) may include one or more SSD controllers (e.g., 1210). The decryption unit 125 may be associated with each of the one or more SSD controllers 1210 of the one or more storage enclosures (e.g., 1205a, 1205b) of the one or more storage racks 1305. In this manner, all of the one or more storage racks 1305 may be continuously authenticated using a single decryption unit 125. When the second physical connection 130 is tampered with, all I/Os associated with all of the one or more storage racks 1305 may be stopped, and invalid responses returned to the host device 105.

Figure 14:
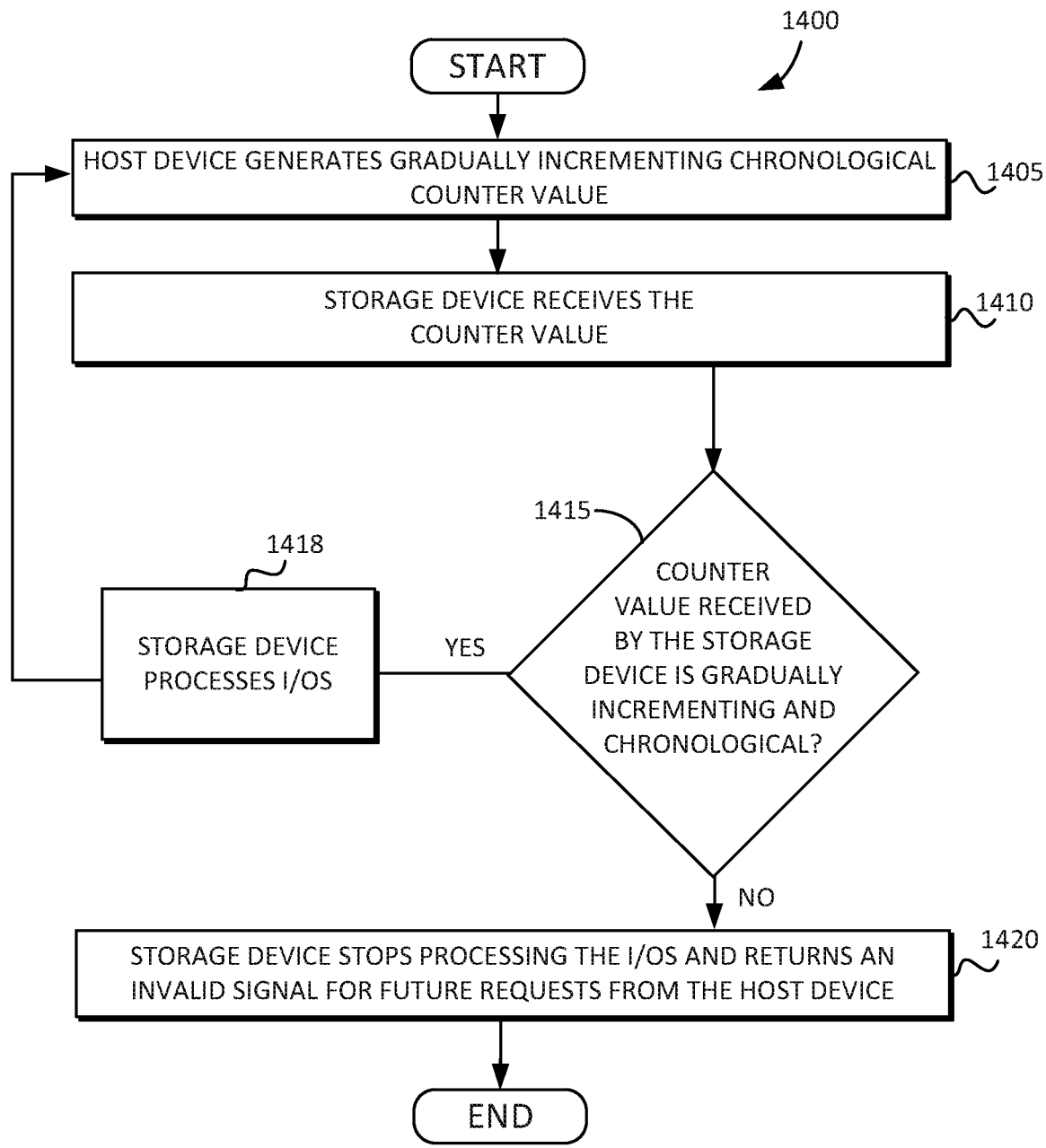
FIG. 14 is a flow diagram showing a technique for operating the continuous authentication system including monitoring a gradually incrementing chronological counter value in accordance with some embodiments.

FIG. 14 is a flow diagram 1400 showing a technique for operating the continuous authentication system including monitoring a gradually incrementing chronological counter value in accordance with some embodiments. At 1405, the host device (e.g., 105 of FIG. 1) may generate a gradually incrementing chronological counter value. For example, the incrementing chronological counter may be periodically incrementing or generated at a predetermined rate. At 1410, the storage device (e.g., 110 of FIG. 1) may receive the counter value. At 1415, the storage device can determine whether the counter value that was received is incrementing and chronological. When the storage device determines that the counter value that was received is incrementing and chronological, then the flow can proceed to 1418. At 1418, the storage device can process I/Os normally, after which the flow can return to 1405. Otherwise, when the storage device determines that the counter value that was received is either not incrementing or not chronological, or both, then the flow can proceed to 1420. At 1420, the storage device can stop processing the I/Os and/or return one or more invalid signals to the host device in response to future requests from the host device.

Figure 15:
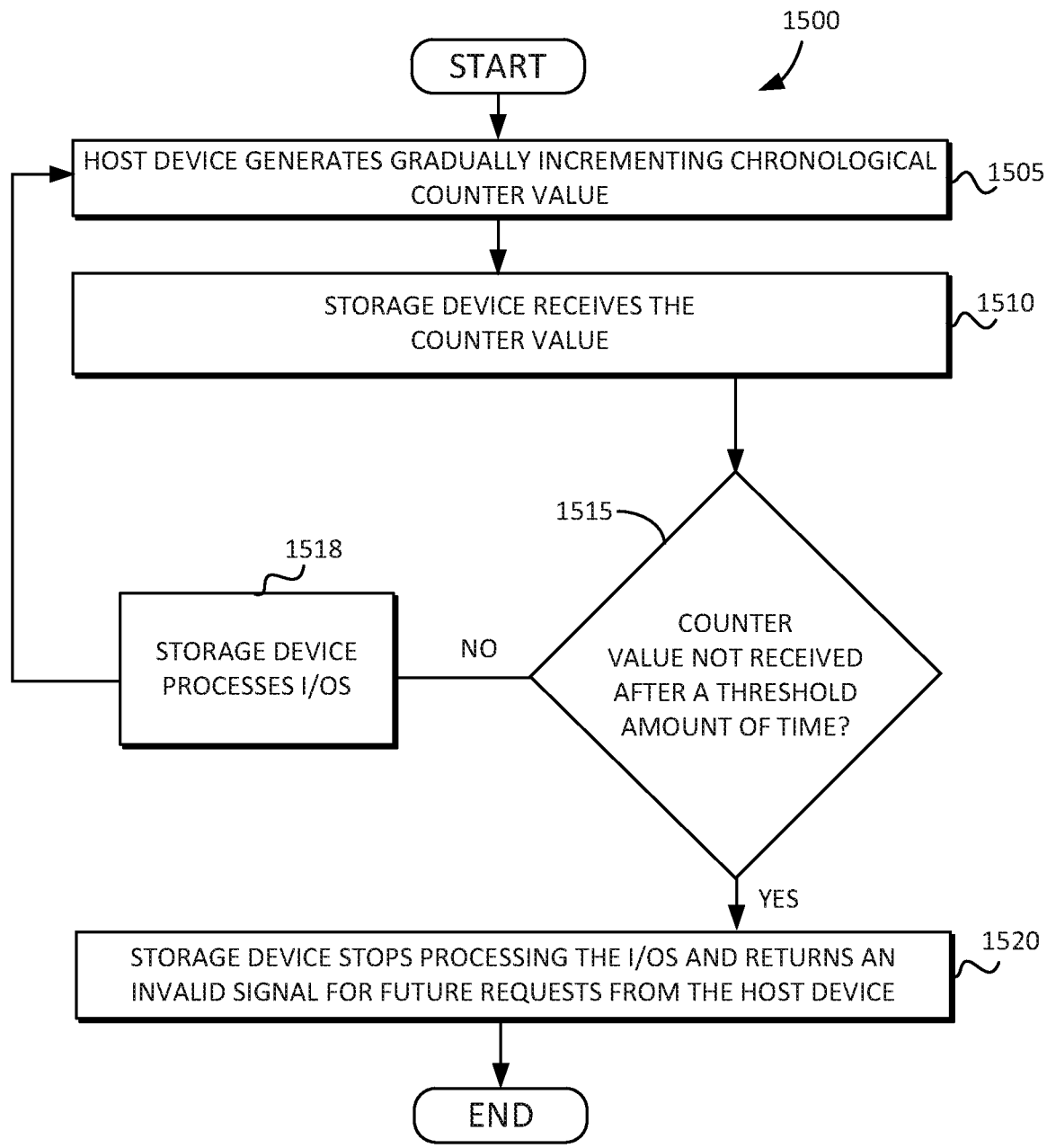
FIG. 15 is a flow diagram showing a technique for operating the continuous authentication system including monitoring for a threshold timeout of the counter value in accordance with some embodiments.

FIG. 15 is a flow diagram showing a technique for operating the continuous authentication system including monitoring for a threshold timeout of the counter value in accordance with some embodiments. At 1505, the host device (e.g., 105 of FIG. 1) may generate a gradually incrementing chronological counter value. For example, the incrementing chronological counter may be periodically incrementing or generated at a predetermined rate. At 1510, the storage device (e.g., 110 of FIG. 1) may receive the counter value. At 1515, the storage device can determine whether the counter value has not been received after threshold amount of time. When the storage device determines that the counter value has not been received after a threshold amount of time, then the flow can proceed to 1520. At 1520, the storage device can stop processing the I/Os and/or return one or more invalid signals to the host device in response to future requests from the host device. Otherwise, when the storage device determines at 1515 that the counter value has been received within the threshold amount of time, then the flow can proceed to 1518. At 1518, the storage device can process I/Os normally, after which the flow can return to 1505.

Some embodiments of the disclosure may include a method for continuously authenticating a storage device. The method can include generating, by a host device, a gradually incrementing chronological counter value. The method can include receiving, by a storage device, the counter value. The method can include determining, by the storage device, whether the received counter value is gradually incrementing and chronological. In response to determining by the storage device that the received counter value is gradually incrementing and chronological, the method can include processing one or more input/outputs (I/Os). In response to determining by the storage device that the received counter value is at least one of a) not gradually incrementing or b) non-chronological, the method can include stopping processing the one or more I/Os.

Some embodiments include a method for continuously authenticating a storage device. The method can include generating, by a host device, a gradually incrementing chronological counter value. The method can include receiving, by a storage device, the counter value. The method can include determining, by the storage device, whether the counter value is received after a threshold amount of time. In response to determining by the storage device that the received counter value is received within the threshold amount of time, the method can include processing one or more input/outputs (I/Os). In response to determining by the storage device that the received counter value is after the threshold amount of time, the method can include stopping processing the one or more I/Os.

The various operations of methods described above may be performed by any suitable means capable of performing the operations, such as various hardware and/or software component(s), circuits, and/or module(s).

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present disclosure can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the present disclosure with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the present disclosure may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this present disclosure as defined in the claims.

What is claimed is:

1. A system, comprising:
a host including an encryption unit;
a storage device including a decryption unit;
a first physical connection between the host and the storage device, wherein the first physical connection is configured to transfer one or more input/output requests (I/O); and
a second physical connection between the host and the storage device, wherein:
the encryption unit is configured to encrypt an authentication signal;
the host is configured to transmit the authentication signal using the second physical connection;
the storage device is configured to receive the authentication signal using the second physical connection;
the decryption unit is configured to decrypt the authentication signal;
the storage device is configured to process the one or more I/O using the first physical connection based on the authentication signal received using the second physical connection; and
the first physical connection includes at least one of a wire, a fiber optic medium, a bus, or a fabric.

2. The system of claim 1, wherein:
the first physical connection supports a first protocol having a first performance characteristic;
the second physical connection supports a second protocol having a second performance characteristic; and
the first performance characteristic of the first protocol is at least one of a) higher bandwidth or b) higher throughput than the second performance characteristic of the second protocol.

3. The system of claim 2, wherein the first physical connection is associated with a main data path, and the second physical connection is associated with a sideband signal channel.

4. The system of claim 1, wherein:
the storage device further includes a solid state drive (SSD) controller;
the SSD controller includes the decryption unit; and
the decryption unit includes a back side illumination (BSI) complementary metal-oxide-semiconductor (CMOS) image sensor.

5. The system of claim 4, wherein the BSI CMOS image sensor is configured to detect a state of the authentication signal.

6. The system of claim 4, wherein:
the SSD controller includes a substrate; and
the BSI CMOS image sensor includes a light receiving part that is disposed on a back side of the substrate.

7. The system of claim 6, wherein the light receiving part comprises a pixel.

8. The system of claim 6, wherein the light receiving part includes a micro-lens.

9. The system of claim 1, wherein:
the storage device further includes one or more storage enclosures;

the one or more storage enclosures includes one or more SSD controllers; and the decryption unit is associated with the one or more SSD controllers of the one or more storage enclosures.

10. The system of claim 1, wherein:

the storage device further includes one or more storage racks;

the one or more storage racks includes one or more storage enclosures;

the one or more storage enclosures includes one or more SSD controllers; and the decryption unit is associated with the one or more SSD controllers of the one or more storage enclosures of the one or more storage racks.

11. The system of claim 1, wherein the storage device is further configured to:

receive a first transmission of the authentication signal using the second physical connection;

receive a second transmission of the authentication signal using the second physical connection;

determine that the first transmission of the authentication signal and the second transmission of the authentication signal provide an indication of a secure connection; and process the one or more I/Os using the first physical connection based on the indication.

12. A system, comprising:

a host including an encryption unit;

a storage device including a decryption unit;

a first physical connection between the host and the storage device, wherein the first physical connection is configured to transfer one or more input/output requests (I/O); and a second physical connection between the host and the storage device, wherein:

the encryption unit is configured to encrypt an authentication signal;

the host is configured to transmit the authentication signal using the second physical connection;

the storage device is configured to receive the authentication signal using the second physical connection;

the decryption unit is configured to decrypt the authentication signal;

the storage device is configured to process the one or more I/O using the first physical connection based on the authentication signal received using the second physical connection; and the authentication signal includes a periodically incrementing integer value.

13. The system of claim 12, wherein the storage device is configured to stop processing the one or more I/O in response to the periodically incrementing integer value having a non-chronological increment.

14. The system of claim 12, wherein the storage device is configured to return one or more signals to the host through the first physical connection in response to the periodically incrementing integer value having a non-chronological increment through the second physical connection.

15. The system of claim 12, wherein the storage device is configured to stop processing the one or more I/O in response to not receiving the periodically incrementing integer value for a period of time that exceeds a threshold value.

16. The continuous authentication system of claim 12, wherein the storage device is configured to return one or more invalid signals to the host through the first physical connection in response to not receiving the periodically incrementing integer value for a period of time that exceeds a threshold value.

17. A system, comprising:

a host including an encryption unit;

a storage device including a decryption unit;

a first physical connection between the host and the storage device, wherein the first physical connection is configured to transfer one or more input/output requests (I/O); and a second physical connection between the host and the storage device, wherein:

the encryption unit is configured to encrypt an authentication signal;

the host is configured to transmit the authentication signal using the second physical connection;

the storage device is configured to receive the authentication signal using the second physical connection;

the decryption unit is configured to decrypt the authentication signal;

the storage device is configured to process the one or more I/O using the first physical connection based on the authentication signal received using the second physical connection; and the second physical connection includes at least one of a) a fiber optic medium or b) a wire.

* * * * *